United States Patent
Urabe

[19]

[11] Patent Number: 6,125,282
[45] Date of Patent: Sep. 26, 2000

[54] PORTABLE INFORMATION TERMINAL USABLE IN A MOBILE COMMUNICATIONS SYSTEM

[75] Inventor: Toshiyuki Urabe, Yamatokoriyama, Japan

[73] Assignee: Sharp Kabushiki Kaisha, Osaka, Japan

[21] Appl. No.: 08/842,649

[22] Filed: Apr. 15, 1997

[30] Foreign Application Priority Data

Apr. 15, 1996 [JP] Japan .................................. 8-092202

[51] Int. Cl.[7] .............................. H04B 1/38; H04Q 7/20; H04M 3/42
[52] U.S. Cl. .......................... 455/552; 455/426; 455/414; 455/557; 455/575
[58] Field of Search .................................... 455/552, 556, 455/557, 553, 456, 457, 414, 432, 435, 434, 550, 575, 403, 422, 466, 418, 344, 346, 426; 340/825.3

[56] References Cited

U.S. PATENT DOCUMENTS

| | | | |
|---|---|---|---|
| 4,989,230 | 1/1991 | Gillig et al. | 455/552 |
| 5,258,964 | 11/1993 | Koma et al. | 455/432 |
| 5,301,359 | 4/1994 | Van Den Heuvel et al. | 455/435 |
| 5,341,410 | 8/1994 | Aron et al. | 455/552 |
| 5,479,476 | 12/1995 | Finke-Analuff | 455/418 |
| 5,579,535 | 11/1996 | Orlen et al. | 455/426 |
| 5,613,213 | 3/1997 | Naddell et al. | 455/414 |
| 5,801,638 | 9/1998 | Ozaki | 455/435 |

FOREIGN PATENT DOCUMENTS

A-5-37462  12/1993  Japan .

Primary Examiner—William G. Trost
Assistant Examiner—Tracy M. Legree
Attorney, Agent, or Firm—Nixon & Vanderhye P.C.

[57] ABSTRACT

With a conventional portable information terminal, to obtain specific information, a user must select a table which stores desired specific information from a plurality of tables each storing specific information. A portable information terminal comprises a plurality of tables A1, A2, ... An, B1, B2, ... Bn which store various types of specific information which is independent upon regions, communication service companies and the like, and the portable information terminal is characterized by comprising means 21, C1 and C2 for inputting, from an external mobile communication terminal 10 which communicates with base stations of a communication system, access information such as identification numbers of the base stations, the communication service companies and the like, which is held by the external mobile communication terminal 10, to select a table which corresponds to the access information from among the plurality of tables A1, A2, ... An, B1, B2, ... Bn.

30 Claims, 10 Drawing Sheets

F I G. 4

| NUMBER OF COMMUNICATION TERMINAL CONTROL PART | COMMUNICATION SERVICE COMPANY | ID NO. OF BASE STATION | ELECTRIC FIELD INTENCITY | OTHER INFORMATION (F. G., BIT ERROR RATE) |
|---|---|---|---|---|

FIG. 6

FIRST INFORMATION ACCESS TABLE C1

| COMMUNICATION TERMINAL CONTROL PART NO. | COMMUNICATION SERVICE COMPANY | ID NO. OF BASE STATION | REGION INFORMATION TABLE NO. |
|---|---|---|---|
| 1 | A | 12345 | 1 |
| 1 | A | 10227 | 1 |
| 1 | A | 21543 | 2 |
| 1 | A | DEFAULT | 3 |
| 1 | B | 12344 | 4 |
| 1 | B | DEFAULT | 3 |
| 2 | C | 345 | 5 |
| 2 | C | DEFAULT | 6 |
| 2 | D | 462 | 7 |
| 2 | D | 156 | 7 |
| 2 | D | DEFAULT | 6 |
| ... | ... | ... | ... |

FIG. 7

SECOND INFORMATION ACCESS TABLE C2

| COMMUNICATION TERMINAL CONTROL PART NO. | COMMUNICATION SERVICE COMPANY | ID NO. OF BASE STATION | REGION INFORMATION TABLE NO. |
|---|---|---|---|
| 1 | A | 12345 | 1 |
| 1 | A | 10227 | 1 |
| 1 | A | 21543 | 2 |
| 1 | A | DEFAULT | 3 |
| 1 | B | 12344 | 4 |
| 1 | B | DEFAULT | 3 |
| 2 | C | 345 | 5 |
| 2 | C | DEFAULT | 6 |
| 2 | D | 462 | 7 |
| 2 | D | 156 | 7 |
| 2 | D | DEFAULT | 6 |
| ... | ... | ... | ... |

FIG. 8

THIRD INFORMATION ACCESS TABLE C3.

| COMMUNICATION TERMINAL CONTROL PART NO. | COMMUNICATION SERVICE COMPANY | ID NO. OF BASE STATION | PRIORTY |
|---|---|---|---|
| 1 | A | 12345, 10227, 21543, ... | 1 |
| 1 | A | 24345, 54631, 23251, ... | 4 |
| 1 | A | DEFAULT | 9 |
| 1 | B | 12344, ... | 5 |
| 1 | B | 22346, 74652, 57554, ... | 6 |
| 1 | B | DEFAULT | 10 |
| 2 | C | 345, 555, 537, 113, ... | 2 |
| 2 | C | 221, 245, 635, 119, ... | 8 |
| 2 | C | DEFAULT | 11 |
| 2 | D | 462, 156, 160, 200, ... | 3 |
| 2 | D | 446, 754, 246, 970, ... | 7 |
| 2 | D | DEFAULT | 12 |
| ... | ... | ... | ... |

FIG. 9

TELEPHONE NUMBER TABLE (EXAMPLE)

| TELEPHONE NUMBER | NAME | REMARKS |
|---|---|---|
| 235-5306 | CUSTOMER SERVICE | TELEPHONE NUMBER FOR SERVICES FROM xxxx TELEPHONE COMPANY |
| *2354 | TRAFFIC INFORMATION | TRAFFIC INFORMATION FOR xxxx AREA |
| 911 | EMERGENCY MEDICAL SERVICE, POLICE, FIRE DEPARTMENT | NUMBERS FOR EMERGENCY MEDICAL SERVICE, POLICE, FIRE DEPARTMENT |

PORTABLE INFORMATION TERMINAL USABLE IN A MOBILE COMMUNICATIONS SYSTEM

BACKGROUND OF THE INVENTION

1. Field of the Invention

The present invention relates to a portable information terminal which also functions as a mobile communication terminal, and to a portable information terminal which can be connected to a mobile communication terminal.

2. Description of the Related Art

A mobile communication terminal, such as a portable telephone and a radio data communication terminal, accesses a plurality of base stations of a certain communication system to which an access is permitted, receives access information, such as an identification number which is assigned to an accessed base station, the type of a communication service company, a field intensity and propagation conditions of bit error rate and the like, from the accessed base station which responds to the access, and holds the access information while communicating through the accessed base station.

Various mobile communication systems have been adopted in various countries and have been each standardized, such as PHS, TACS and PDC for portable telephones in Japan, AMPS which serves as standards for analog cellular phones in North America, CDPD, RAM and Ardis which serve as standards for mobile data communication in North America, and GSM which serves as standards for digital cellular phones in Europe.

Further, for each system, necessary access information, such as identification numbers of a base station and a terminal, identification information of a communication service company, a field intensity and a bit error rate, is defined which is needed for accessing each communication system. For example, for base stations which are currently accessed, there are system ID (SID) which is used in the AMPS method, cell ID (CellID) which is used in the CDPD method, etc.

In addition to a clock function, a calendar function and the like, a portable information terminal has functions of inputting, holding, displaying, searching and correcting various information. The various information includes general information, such as a schedule, an action list, a dictionary and a memory, and additionally specific information.

The specific information is classified into three types, i.e., information dependent upon regions, information dependent upon communication service companies, and information dependent upon both regions and communication service companies. Examples of specific information which is dependent upon regions are addresses of entities, such as a tourist information bureau, a public organization and a branch office of an enterprise, which are located in a certain city, or the contents of major events of the city. Such items regarding each city are stored in one table. Alternatively, examples are a currency, a climate condition, holidays, addresses of embassy buildings and the like of a country, and these items regarding each city are stored in one table. Further, a local time is of the same kind. Local times of various countries or cities are stored in one table. This information is extremely important for the United States of America where there are a number of time zones, and for Southeast Asia and Europe where there are a number of countries next to each other.

Examples of specific information which is dependent upon communication service companies are telephone numbers for customer support which is available from each communication service company which are related to a telephone function, and a network address of a host server of each communication service company and telephone numbers of access points which are related to a data communication function. These pieces of information are stored in one table, for each communication service company.

Examples of specific information which is dependent upon both regions and communication service companies are telephone numbers for customer services, such as a traffic information service, a weather forecast service and a tourist information service, for each region which are uniquely available from each communication service company, or telephone numbers for reaching the police, an emergency medical service, a fire department and the like. These pieces of information are stored in one table, for each region and each communication service company.

Among such a portable information terminal, a portable information terminal which has a mobile communication function to also serve as a mobile communication terminal and a portable information terminal which can be used as it is connected to a mobile communication terminal have been proposed.

When a user obtains specific information through a portable information terminal, he must select one table which stores the desired specific information out of a plurality of tables which store specific information. To this end, the user himself must search the respective tables or enter a predetermined input (e.g., data such as a region and a communication service company). The former case takes a considerable amount of time for the very search process, whereas the latter case requires the user to recognize data to enter. Thus, the user cannot treat information efficiently, and an operation is complex.

Further, as the user is required to select a table, it is possible that the user selects a table which stores wrong specific information (which is not the desired specific information) because of some reason (e.g., a wrong enter) and consequently obtains the wrong specific information. Among the specific information, those which are related to communication, such as telephone numbers, in particular, are difficult to judge if the obtained information is the desired information. Hence, the user may execute unnecessary communication using the wrong information, which results in a wasteful communication cost.

As a portable information terminal which has a function to serve as a mobile communication terminal, such a portable information terminal has been proposed whose function as a mobile communication terminal is realized by a plurality of different communication systems rather than by only one communication system. With such a portable information terminal, a user can switch communication systems for communication.

However, to this end, the user must judge which communication system is most appropriate. This is difficult since whether subscription is required, a charging system, the types of services are different among different communication systems. There can be a problem that as a result of switching communication systems, a communication cost becomes expensive for wasteful communication or the quality of communication degrades.

SUMMARY OF THE INVENTION

Hence, a first object of the invention is to provide a portable information terminal which does not require a user to select a table which stores predetermined specific information when the specific information is to be obtained.

Next, a second object of the invention is to provide a portable information terminal which is provided with a mobile communication function which is realized by a plurality of different communication systems so that a user does not have to switch communication systems for communication.

To achieve the objects above, a portable information terminal according to a first aspect is a portable information terminal including a plurality of tables which store various types of specific information dependent upon regions, communication service companies and the like, the portable information terminal comprising means for inputting access information, such as identification numbers of a base station and a communication service company, which is contained in an external mobile communication terminal which communicates with the base station of a communication system, to select a table corresponding to the access information out of the plurality of tables, through the mobile communication terminal.

Further, in the portable information terminal according to the first aspect, a portable information terminal according to a second aspect is characterized by comprising means for holding the access information which is inputted through the mobile communication terminal.

Further, a portable information terminal which has a mobile communication function according to a third aspect comprises a function as a terminal of a mobile communication system which is structured by a plurality of base stations, such as a radio telephone and radio data communication, and is characterized by comprising means for holding access information, such as identification numbers of base stations and a communication service company, a plurality of tables which store various types of specific information dependent upon regions, communication service companies and the like, and means for selecting a table corresponding to the access information which is held by the holding means, from among the plurality of tables.

In the portable information terminals according to the first, the second and the third aspects, since a table corresponding to access information which is held by the mobile communication terminal or the holding means is selected from among the plurality of tables which store the specific information, when desired specific information is to be obtained, selecting a table by a user is not necessary.

As described above, with these portable information terminals, since the portable information terminal selects a table which stores specific information in accordance with access information, when desired specific information is to be obtained, a user does not have to select a table which stores the specific information. Hence, it is not necessary to search among the respective tables for selecting a table or to enter a predetermined input, so that the user can treat information efficiently, the operation of the terminal is simplified and the operability is improved. Further, there is no possibility that wrong specific information (which is not the desired specific information) is obtained, and therefore, when communication is to be executed using specific information, unnecessary communication is avoided and a wasteful communication cost is eliminated.

Further, a portable information terminal which has a mobile communication function according to a fourth aspect has a function as a terminal of mobile communication systems which are structured by a plurality of base stations, such as radio telephones and radio data communication, and comprises a plurality of means for holding access information, such as identification numbers of base stations and communication service companies, a plurality of tables which store various types of specific information dependent upon regions, communication service companies and the like, means for selecting a table corresponding to plural pieces of access information which are held by the holding means, from among from the plurality of tables, and means for selecting the holding means corresponding to the plural pieces of access information from among the plurality of holding means.

Since the portable information terminal according to the fourth aspect selects a table corresponding to plural pieces of access information which are held by the plurality of holding means, from among the plurality of tables which store the specific information, when desired specific information is to be obtained, a user does not have to select a table.

Further, from among the plurality of holding means upon which the communication systems are dependent, the holding means corresponding to the plural pieces of access information which are held by the plurality of holding means is selected. Since this is equal to switching the communication systems, a user does not have to switch the communication systems for communication.

Since the portable information terminal selects a table which stores specific information in accordance with access information, when desired specific information is to be obtained, a user does not have to select a table which stores the specific information. Hence, it is not necessary to search among the respective tables for selecting a table or to enter a predetermined input, so that the user can treat information efficiently, an operation is simplified and the operability is improved. Further, there is no possibility that wrong specific information (which is not the desired specific information) is obtained, and therefore, when communication is to be executed using specific information, unnecessary communication is avoided and a wasteful communication cost is eliminated.

Further, the portable information terminal of the invention functions as a mobile communication terminal for a plurality of different communication systems, and since the portable information terminal judges which communication system is optimum and switches the communication systems, the user does not have to switch the communication systems for communication, which in turn suppresses a communication cost or improve the quality of communication.

BRIEF DESCRIPTION OF THE DRAWINGS

Now referring to the drawings, preferred embodiments of the invention are described below.

Other and further objects, features, and advantages of the invention will be more explicit from the following detailed description taken with reference to the drawings wherein:

FIG. 4 is a view showing a format for an information terminal control part 21 to take in access information;

FIG. 6 is a view showing a first information access table C1;

FIG. 7 is a view showing a second information access table C2;

FIG. 8 is a view showing a third information access table C3;

FIG. 9 is a view showing a telephone number table; and

DESCRIPTION OF THE PREFERRED EMBODIMENTS

Figure 1:
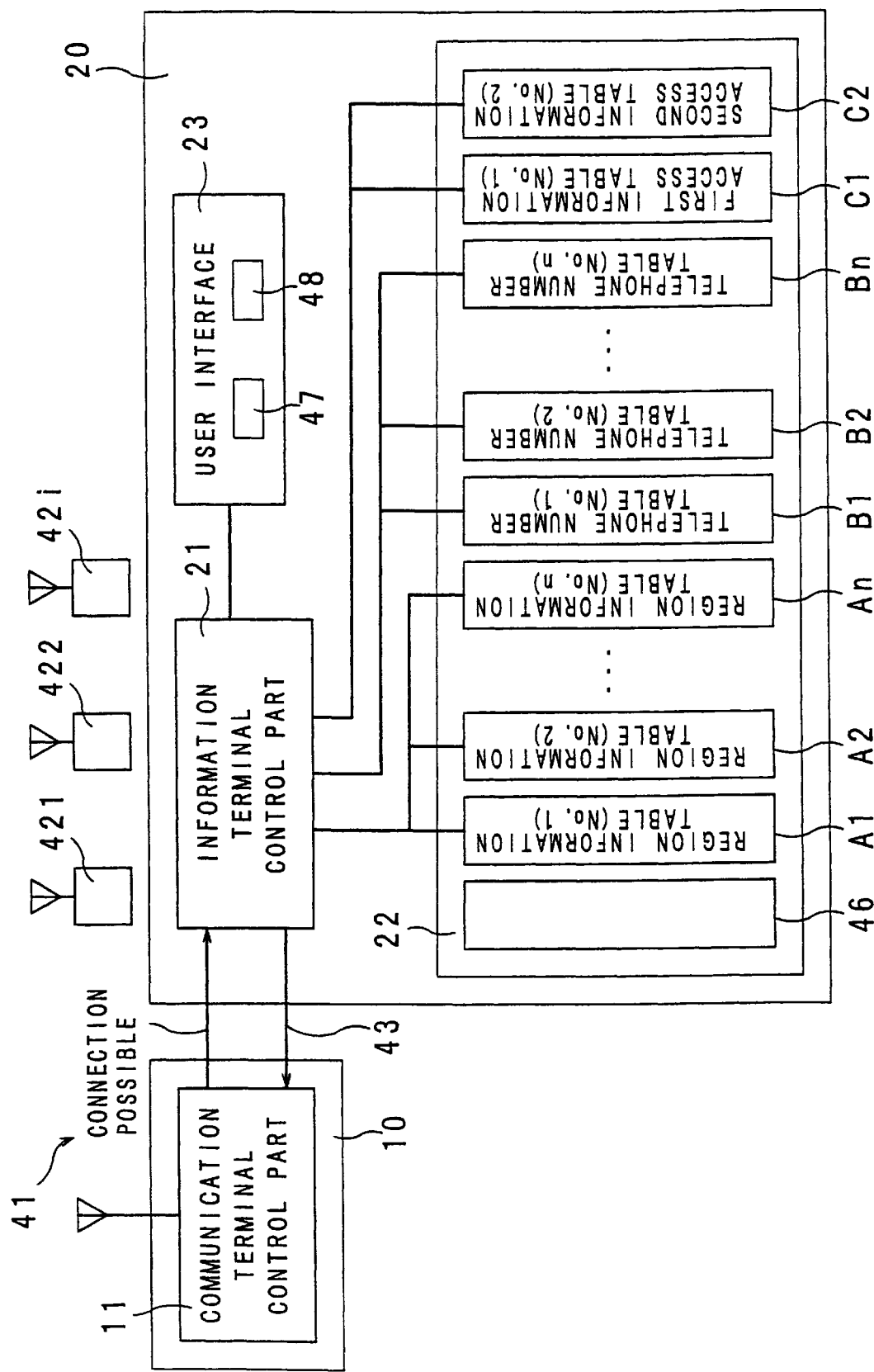
FIG. 1 is a block diagram of a portable information terminal according to a first preferred embodiment of the invention.

Now referring to the drawings, preferred embodiments of the invention are described below.

FIG. 1 is a block diagram of a portable information terminal 20 according to a first preferred embodiment of the invention. The portable information terminal 20 comprises an information terminal control part 21, a memory device 22 and a user interface 23.

The information terminal control part 21 of FIG. 1 is connectable to and detachable from a communication terminal control part 11 via a connection 43. The communication terminal control part 11 accesses a plurality of base stations, namely, i base stations 421 to 42i of a communication system 41, receives access information, such as an identification number which is assigned to an accessed base station, the type of a communication service company, a field intensity and propagation conditions of bit error rate and the like, from the base station 421 which is in response to the access, and holds such information. The communication terminal control part 11 is connectable to a mobile communication terminal 10 which can externally output the access information in a predetermined format which is shown in FIG. 4, for example, by means of a serial bus and an infrared ray. The format of a signal which is given to the mobile communication terminal 10 from the communication terminal control part 11 is shown in FIG. 4. This format includes an identification number of the communication terminal control part 11, information which expresses a communication service company which operates the communication system, identification numbers of base stations, information which expresses a field intensity and other information. The information herein mentioned is a bit error rate, for instance. The mobile communication terminal 10 takes in and holds the access information which is held by the communication terminal control part 11, together with the identification number of the communication terminal control part 11, in the format which is shown in FIG. 4 at predetermined time intervals, to update the access information. The information terminal control part 21 may take in the access information, when a command requesting such is entered from outside.

Figure 2:
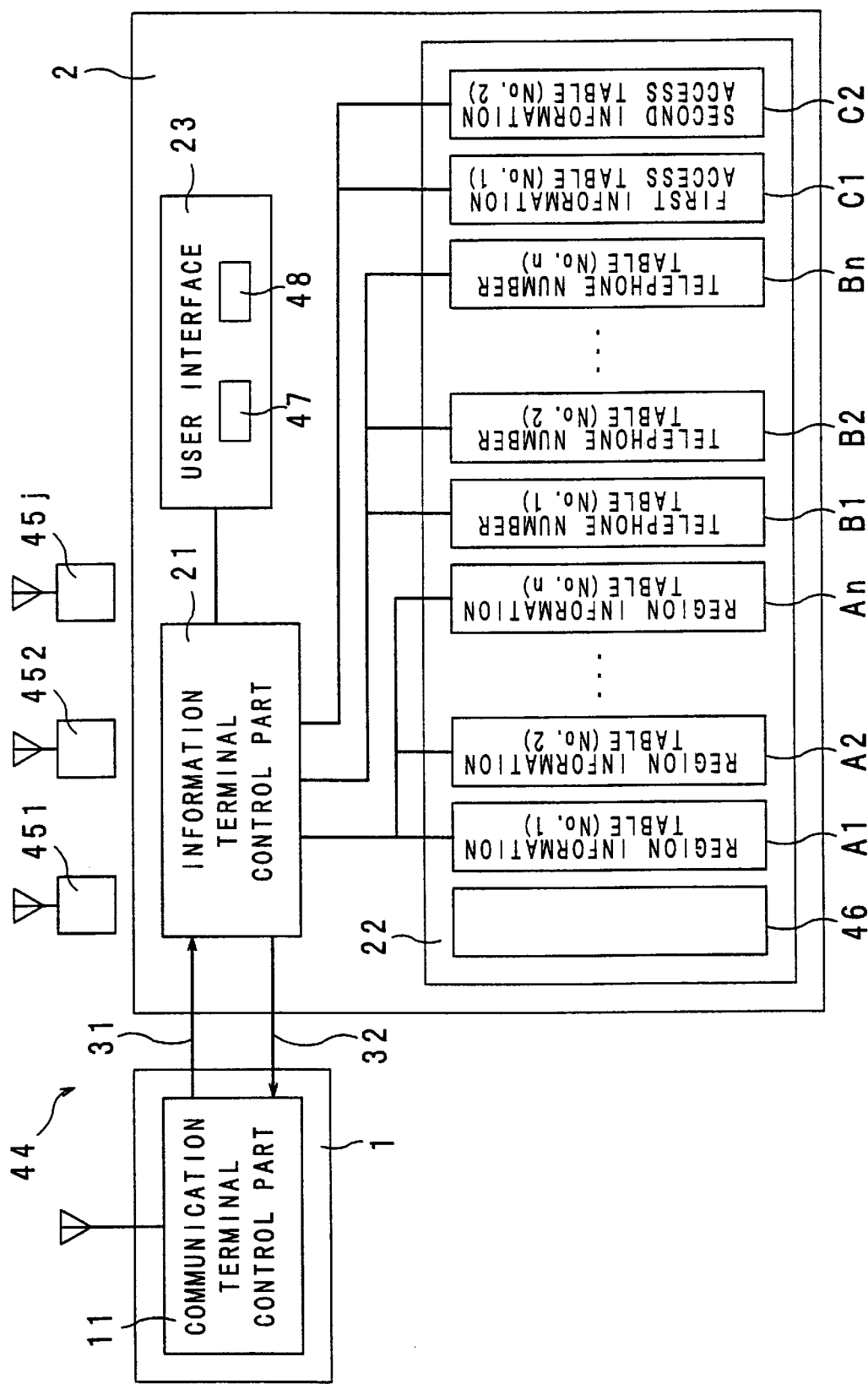
FIG. 2 is a block diagram of a portable information terminal which has a mobile communication function according to a second preferred embodiment of the invention.

FIG. 2 is a block diagram of a portable information terminal which has a mobile communication function according to a second preferred embodiment of the invention. The portable information terminal is comprised of a mobile communication terminal part 1 which includes the communication terminal control part 11, and the portable information terminal part 2 which is formed by the information terminal control part 21, the memory device 22 and the user interface 23. The communication terminal control part 11 and the information terminal control part 21 are connected with each other by internal buses 31, 32.

The communication terminal control part 11 accesses the j base stations 451 to 45j of a communication system 44, receives access information, such as an identification number of the base station 451, the type of a communication service company, a field intensity and propagation conditions of bit error rate and the like, from the base station 451 which responds to the access and holds the access information, and the information terminal control part 21 of FIG. 2 takes in the access information, together with the number of the communication terminal control part 11, from the communication terminal control part 11 in the format which is shown in FIG. 4 at predetermined time intervals through the internal bus 31 and holds the access information so that the access information is updated. The information terminal control part 21 may take in the access information when a command demanding such is entered from outside.

Now, common portions of the respective preferred embodiments of FIGS. 1 and 2 will be described in the following. In the memory device 22, there exist (a) a table 46 which stores general information such as a schedule and an action list, (b) region information tables A1, A2, . . . An which store the specific information which is dependent upon regions in such a manner that with respect to each region, addresses of a tourist information bureau, a public organization, branch offices of enterprises and the like are stored in one table, (c) telephone number tables B1, B2, . . . Bn which store the specific information which is dependent upon both regions and communication service companies in such a manner that telephone numbers for customer services and the like with respect for each region and each communication service company are stored in one table, and (d) a first information access table C1 for selecting one table from the region information tables A1, A2, . . . An and a second information access table C2 for selecting one table from the telephone number tables B1, B2, . . . Bn.

The user interface 23 is disposed so that information is provided to a user by means of displaying means 47 and a user can enter a command through the inputting means 48. Further, the user interface 23 allows storage of new information in the respective tables which are formed within the memory device 22, to correct the stored information, to search among the stored information, etc.

Figure 5:
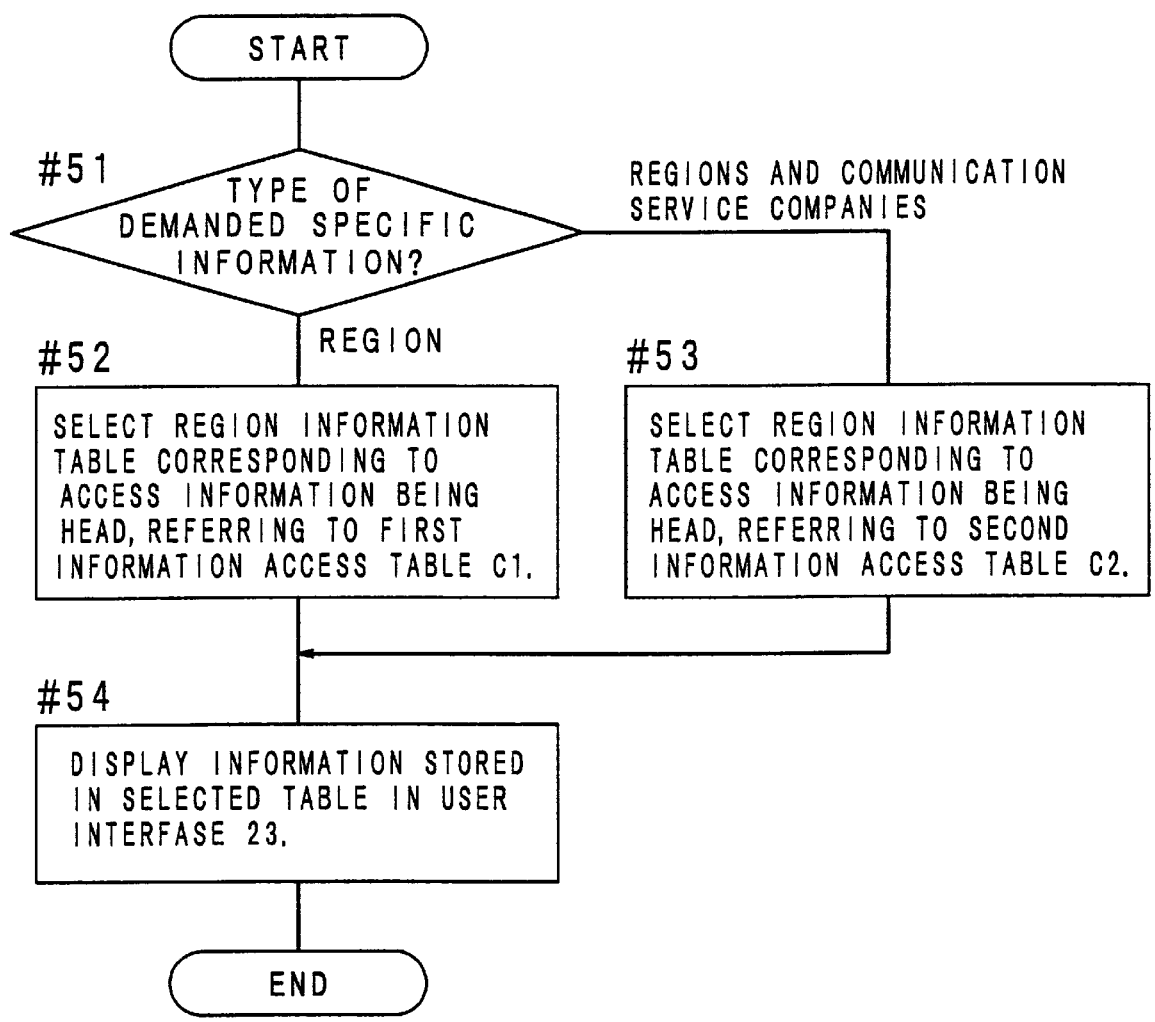
FIG. 5 is a flow chart showing an operation which is performed by the information terminal control part 21 of FIGS. 1 and 2 in response to a request from a user to display specific information.

Now, a description will be given on a flow of operations which are performed by the information terminal control part 21 when a user enters a command which demands to display specific information through the user interface 23, with reference to the flow chart in FIG. 5. First, whether the specific information which is demanded by the user is dependent upon regions or both regions and communication service companies is judged (Step #51).

Next, the first information access table C1 stores the identification numbers of the communication terminal control parts 11, communication service companies, the identification numbers of the base stations, and table numbers which are assigned to the respective region information tables relative to each other, as shown in FIG. 6. When a result obtained at step #51 indicates that the demanded specific information is dependent upon regions, the first information access table C1 is referred to so as to select the region information table with the table number which is stored in association with the number of the communication terminal control part, the communication service company and the identification number of the base station of the access information which is held (Step #52).

Meanwhile, the second information access table C2 stores the identification numbers of the communication terminal control parts 11, communication service companies, the identification numbers of the base stations, and table numbers which are assigned to the respective telephone number information tables relative to each other, as shown in FIG. 7. When a result obtained at step #51 indicates that the demanded specific information is dependent upon both regions and communication service companies, the second information access table C2 is referred to so as to select the telephone number table with the table number which is stored in association with the number of the communication terminal control part, the communication service company and the identification number of the base station among the access information which is held (Step #53).

When there is no desired one among the identification numbers of the base stations 421 to 42j and 451 to 45j in the respective tables C1 and C2 of FIGS. 6 and 7, this situation is treated as DEFAULT.

Next, information which is stored in the region information table which is selected at step #52 or in the telephone number table which is selected at step #53 is displayed on the displaying means 47 of the user interface 23 (Step #54). An example of the telephone number table is as shown in FIG. 9. Such information is displayed.

The communication terminal control parts select a table in the manner above, using the access information. Hence, a user can obtain desired specific information without searching the respective tables and selecting one and without entering a region, a communication service company and the like through the inputting means 48 and selecting a table.

Therefore, a user can treat information efficiently, an operation is simplified and the operability is improved. Further, there is no possibility that wrong specific information (which is not the desired specific information) is obtained, and therefore, when communication is to be executed using specific information, unnecessary communication is avoided and a wasteful communication cost is eliminated.

When a telephone number is included in the information which is displayed by the displaying means 47 of the user interface 23 and the user wishes to call the telephone number, the user enters a command demanding such through the inputting means 48 of the user interface 23. As a result, a call request and the telephone number are sent to the communication terminal control part 11 from the information terminal control part 21, and the communication terminal control part 11 executes calling. Thus, the user can communicate with a person at the telephone number which is the specific information, without entering the telephone number once again by himself.

Figure 3:
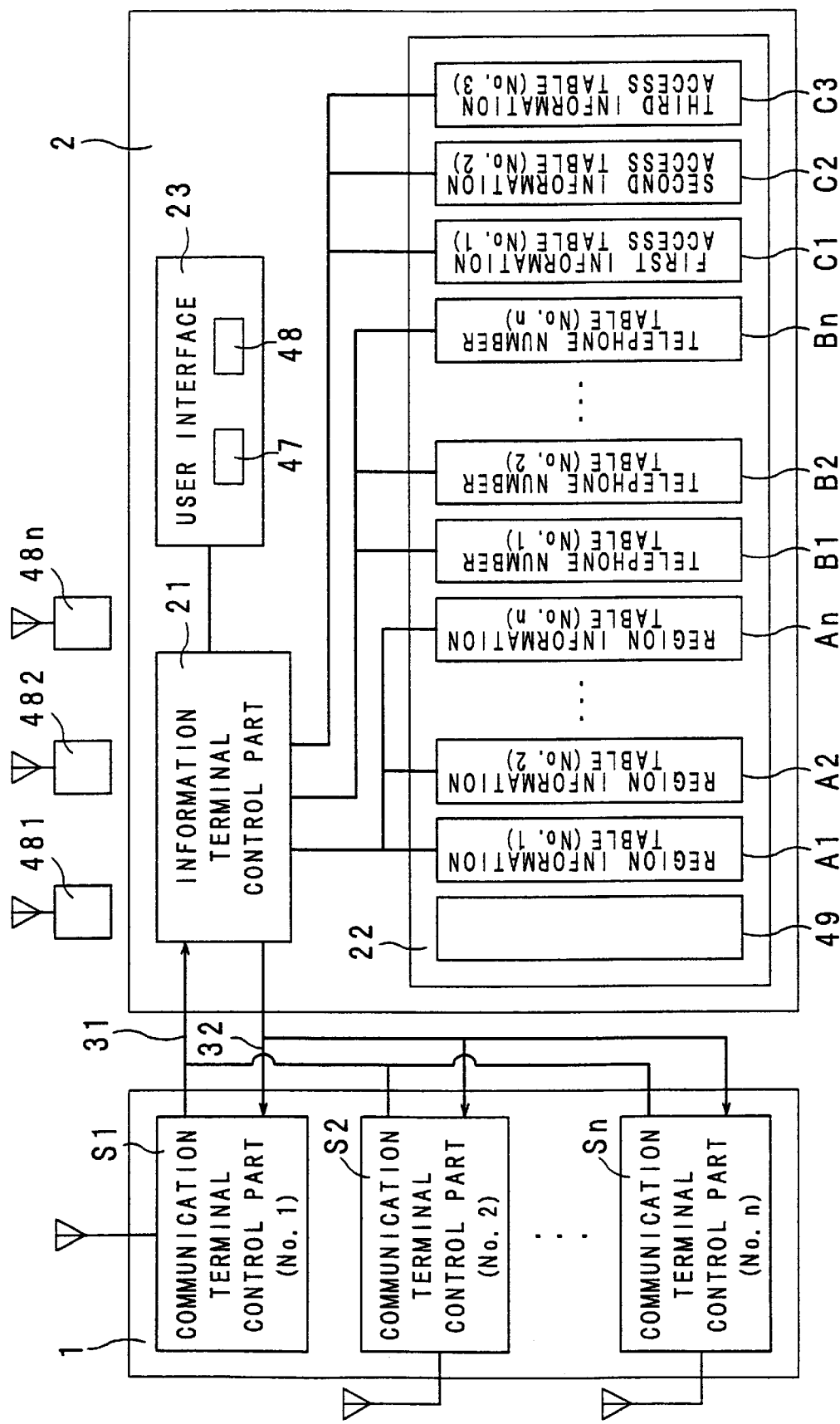
FIG. 3 is a block diagram of a portable information terminal which has a mobile communication function according to a third preferred embodiment of the invention.

FIG. 3 is a block diagram of a portable information terminal which has a mobile communication function which is realized by a plurality of communication systems, i.e., n communication systems, according to a third preferred embodiment of the invention. The portable information terminal with the mobile communication function is formed by a mobile communication terminal part 1, which consists of a plurality of communication terminal control parts, i.e., communication terminal control parts S1, S2, . . . Sn which have different communication systems from each other, and information terminal part 2, which is formed by an information terminal control part 21, a memory device 22 and a user interface 23. The communication terminal control parts S1, S2, . . . Sn and the information terminal control part 21 are connected with each other by internal buses 31, 32.

The communication terminal control parts S1, S2, . . . Sn respectively access a plurality of base stations, i.e., n base stations 481 to 48n, receives access information, such as identification numbers of the base stations, the types of communication service companies, a field intensity and propagation of a bit error rate and the like, from the base stations 481 to 48n which are responding to the accesses and holds the access information.

The information terminal control part 21 takes in the access information which is held by the respective communication terminal control parts S1 to Sn, together with the numbers of the communication terminal control parts S1 to Sn, in the format which is shown in FIG. 4 at predetermined time intervals through the internal bus 31 and holds the access information so that the access information is updated. Thus, the information terminal control part 21 holds plural pieces of the access information. The information terminal control part 21 may take in the access information when a command demanding such is entered from outside.

In the memory device 22, there exist (a1) a table 49 which stores general information such as a schedule and an action list, (b1) region information tables A1, A2, . . . An which store the specific information which is dependent upon regions in such a manner that with respect to each region, addresses of a tourist information bureau, a public organization, branch offices of enterprises and the like are stored in one table, (c1) telephone number tables B1, B2, . . . Bn which store the specific information which is dependent upon both regions and communication service companies in such a manner that telephone numbers for customer services and the like with respect for each region and each communication service company are stored in one table, (d1) a first information access table C1 for selecting one table from the region information tables A1, A2, . . . An, (e1) a second information access table C2 for selecting one table from the telephone number tables B1, B2, . . . Bn, (e2) a third information access table C3 for selecting from the communication terminal control parts S1 to Sn.

The user interface 23 is disposed so that information is provided to a user by means of displaying means 47 and a user can enter a command through the displaying means 48. Further, the user interface 23 allows to store new information in the respective tables which are formed within the memory device 22, to correct the stored information, to search among the stored information, etc.

Figure 10:
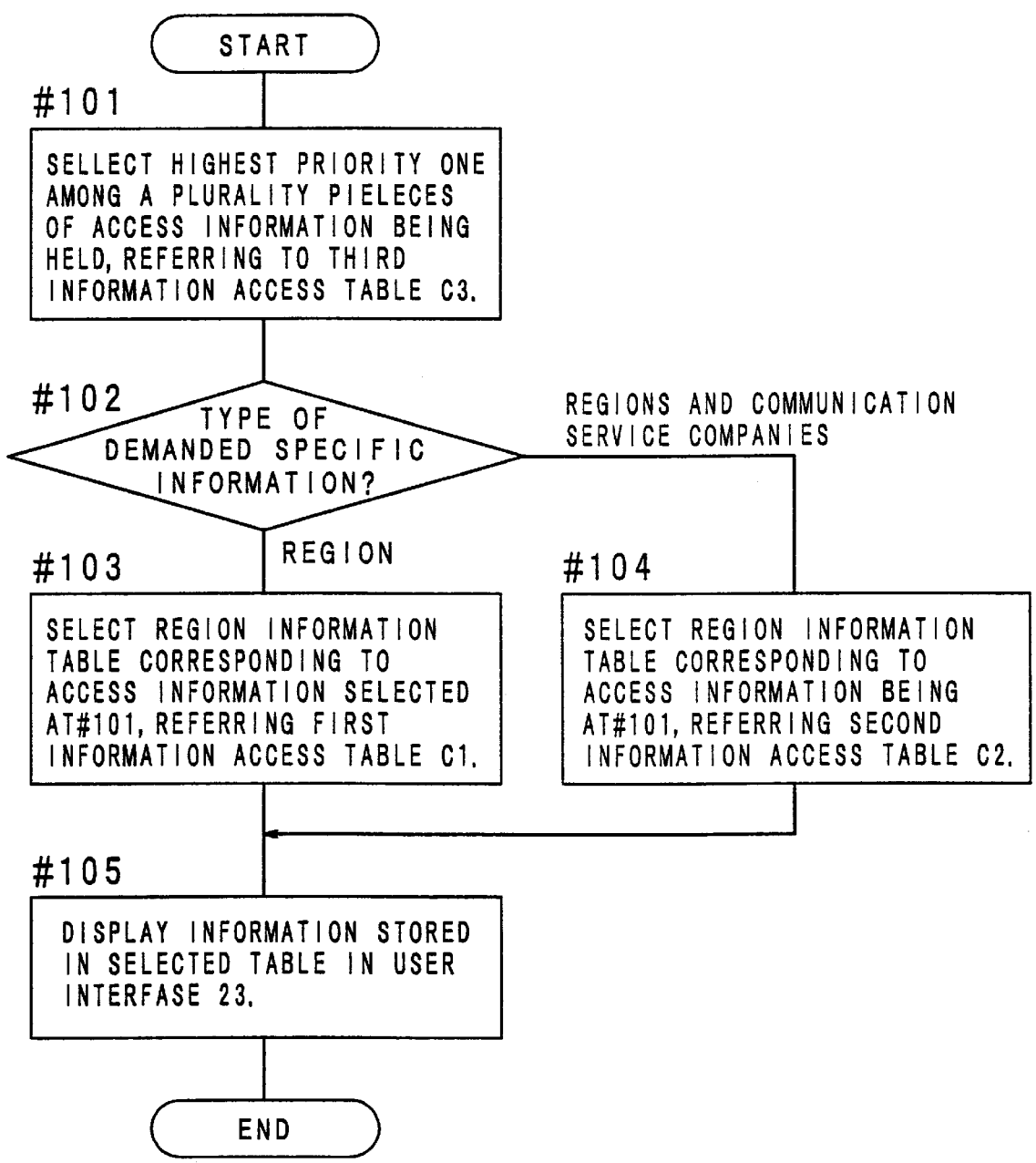
FIG. 10 is a flow chart showing an operation which is performed by the information terminal control part 21 of FIG. 3 in response to a request from a user to display specific information.

Now, a description will be given on a flow of operations which are performed by the information terminal control part 21 when a user enters a command which demands to display specific information through the displaying means 48 of the user interface 23, with reference to the flow chart in FIG. 10. First, the third information access table C3 stores the numbers of the communication terminal control parts, communication service companies, the identification numbers of the base stations, and priorities relative to each other, as shown in FIG. 8. The first information access table C1 is referred to, and from the plural pieces of the access information which are held by the third information access table C3, the access information with the highest priority to the number of the communication terminal control part, the communication service company and the identification number of the base station is selected (Step #101).

At this point, the communication terminal control part which is to be used for communication is selected. That is, the communication system is switched. If the priorities are stored considering a communication cost, for instance, in the first information access table C1, it is possible to suppress a communication cost and improve the quality of communication.

In FIGS. 6, 7 and 8 described above, when there is not anything which corresponds to the identification numbers of the base stations, this situation is treated as DEFAULT. Alternatively, the third information access table C3 may store allowable field intensities so that access information regarding a weak field intensity which is equal to or lower than a predetermined value is excluded, i.e., a communication failure is prevented.

Next, whether the specific information which is demanded by the user is dependent upon regions or both regions and communication service companies is judged (Step #102).

Next, since the first information access table C1 stores the numbers of the communication terminal control parts, communication service companies, the identification numbers of the base stations, and table numbers which are assigned to the respective region information tables relative to each other as shown in FIG. 6, when a result obtained at step #102 indicates that the demanded specific information is dependent upon regions, the first information access table C1 is referred to so as to select the region information table with the table number which is stored in association with the number of the communication terminal control part, the communication service company and the identification number of the base station of the access information which is specified at step S101 (Step #103).

Meanwhile, since the second information access table C2 stores the numbers of the communication terminal control parts, communication service companies, the identification numbers of the base stations, and table numbers which are assigned to the respective telephone number information tables relative to each other, as shown in FIG. 7, when a result obtained at step #102 indicates that the demanded specific information is dependent upon both regions and communication service companies, the second information access table C2 is referred to so as to select the telephone number table with the table number which is stored in association with the number of the communication terminal control part, the communication service company and the identification number of the base station of the access information which is specified at step S101 (Step #104).

Next, information which is stored in the region information table which is selected at step #103 or in the telephone number table which is selected at step #104 is displayed by the user interface 23 (Step #105). An example of the telephone number table is as shown in FIG. 9. Such information is displayed.

The communication terminal control parts select a table in the manner above, using the access information. Hence, a user can obtain desired specific information without searching the respective tables and without entering a region, a communication service company and the like and selecting a table by himself.

Therefore, a user can treat information efficiently, an operation is simplified and the operability is improved. Further, there is no possibility that wrong specific information (which is not the desired specific information) is obtained, and therefore, when communication is to be executed using specific information, unnecessary communication is avoided and a wasteful communication cost is eliminated.

When a telephone number is included in the information which is displayed by the displaying means 47 of the user interface 23 and the user wishes to call the telephone number, the user enters a command demanding such through the inputting means 48 of the user interface 23. As a result, through the internal bus 32, a call request and the telephone number are sent from the information terminal control part 21 to the communication terminal control part whose number is included in the address information which is specified at step #101, and this communication terminal control part executes calling. Thus, the user can communicate with a person at the telephone number which is the specific information, without entering the telephone number once again by himself.

The invention may be embodied in other specific forms without departing from the sprit or essential characteristics thereof. The present embodiments are therefore to be considered in all respects as illustrative and not restrictive, the scope of the invention being indicated by the appended claims which come within the meaning and the range of equivalency of the claims are therefore intended to be embraced therein.

What is claimed is:

1. A portable information terminal provided with a plurality of tables which store information dependent upon particular regions and information dependent upon particular combinations of regions and communication service companies, and means for outputting the information stored in the plurality of tables, the portable information terminal further comprising:

means for inputting access information contained in an external mobile communication terminal which is detachable from the portable information terminal, the access information being usable to select one or more of the tables.

2. The portable information terminal of claim 1, further comprising means for holding the access information inputted through the mobile communication terminal.

3. The portable information terminal according to claim 1, wherein the information dependent upon particular regions includes one or more of addresses, currency data, climate condition, holidays and local time zone.

4. The portable information terminal according to claim 1, wherein the information dependent upon particular combinations of regions and communication service companies comprises third-party telephone numbers.

5. The portable information terminal according to claim 1, wherein the access information comprises one or more of a communication service company identifier, a base station identifier, a field intensity and a bit error rate.

6. The portable information terminal according to claim 1, wherein the means for outputting the information is a display which is part of a user interface.

7. The portable information terminal according to claim 6, wherein said user interface further comprises an input device for inputting a call request based on displayed information.

8. The portable information terminal according to claim 1, wherein the external mobile communication terminal communicates with a base station of a communications system to obtain the access information.

9. The portable information terminal according to claim 1, further comprising:

a first information access table that is referred to in selecting from among tables that store information dependent upon particular regions;

a second information access table that is referred to in selecting from among tables that store information dependent upon particular combinations of regions and communication service companies; and means responsive to a demanded specific information for selecting with reference to the first information access table a table that stores information dependent upon one particular region, or for selecting with reference to the second information access table a table that stores information dependent upon one particular combination of a region and a communication service company.

10. A portable information terminal operable as a terminal of a mobile communication system, the portable information terminal comprising:

a communication terminal control section configured to access a base station of a mobile communication system, to receive access information from the accessed base station, and to hold the received access information;

a plurality of tables which store information dependent upon particular regions and information dependent upon particular combinations of regions and communication service companies; and means for selecting one or more of the tables based on the access information which is held by the communication terminal control section.

11. The portable information terminal according to claim 10, wherein the information dependent upon particular regions includes one or more of addresses, currency data, climate condition, holidays and local time zone.

12. The portable information terminal according to claim 10, wherein the information dependent upon particular combinations of regions and communication service companies comprises third-party telephone numbers.

13. The portable information terminal according to claim 10, wherein the access information comprises one or more of a communication service company identifier, a base station identifier, a field intensity and a bit error rate.

14. The portable information terminal according to claim 10, further comprising a user interface including a display for displaying information from the one or more tables accessed using the access information.

15. The portable information terminal according to claim 14, wherein said user interface further comprises an input device for inputting a call request based on displayed information.

16. The portable information terminal according to claim 10, further comprising:

a first information access table that is referred to in selecting from among tables that store information dependent upon particular regions;

a second information access table that is referred to in selecting from among tables that store information dependent upon particular combinations of regions and communication service companies; and means responsive to a demanded specific information for selecting with reference to the first information access table a table that stores information dependent upon one particular region, or for selecting with reference to the second information access table a table that stores information dependent upon one particular combination of a region and a communication service company.

17. A portable information terminal operable as a terminal of a mobile communications system, the portable information terminal comprising:

a plurality of communication terminal control sections each configured to access a base station of a different communications system, to receive access information from the accessed base station, and to hold the received access information;

a plurality of tables which store information dependent upon particular regions and information dependent upon particular combinations of regions and communication service companies;

means for selecting the access information held by one of said communication terminal control sections; and means for selecting one or more of the tables based on the selected access information.

18. The portable information terminal according to claim 17, wherein the information dependent upon particular regions includes one or more of addresses, currency data, climate condition, holidays and local time zone.

19. The portable information terminal according to claim 17, wherein the information dependent upon particular combinations of regions and communication service companies comprises third-party telephone numbers.

20. The portable information terminal according to claim 17, wherein the access information comprises one or more of a communication service company identifier, a base station identifier, a field intensity and a bit error rate.

21. The portable information terminal according to claim 17, further comprising a user interface including a display for displaying information from the one or more tables accessed using the access information.

22. The portable information terminal according to claim 21, wherein said user interface further comprises an input device for inputting a call request based on displayed information.

23. The portable information terminal according to claim 17, wherein the access information is prioritized and the access information is selected based on the priorities.

24. The portable information terminal according to claim 17, further comprising:

a first information access table that is referred to in selecting from among tables that store information dependent upon particular regions; and a second information access table that is referred to in selecting from among tables that store information dependent upon particular combinations of regions and communication service companies, and wherein said means for selecting is responsive to a demanded specific information for selecting with reference to the first information access table a table that stores information dependent upon one particular region, or for selecting with reference to the second information access table a table that stores information dependent upon one particular combination of a region and a communication service company.

25. A portable information terminal, comprising:

a communication terminal control section which communicates with base stations of communication systems to obtain access information;

a memory which stores first tables each of which contains information dependent upon a particular region and second tables each of which contains information dependent upon a particular combination of a region and a communication service company, the information dependent upon a particular combination of a region and a communication service comprising third party telephone numbers;

a user interface comprising an input device and an output device, said input device receiving user-supplied requests for information stored in the memory; and an information terminal control section connected to the communication terminal control section, the information terminal control section being responsive to the user-supplied requests to use the access information obtained by the communication terminal control section to supply information from the memory to the output device.

26. The portable information terminal according to claim 25, wherein each first table includes one or more of addresses, currency data, climate condition, holidays and local time zone.

27. The portable information terminal according to claim 25, wherein the third-party telephone numbers include telephone numbers for one or more of a traffic information service, a weather forecast service, police, emergency medical service and fire department.

28. The portable information terminal according to claim 25, wherein the access information comprises one or more of a communication service company identifier, a base station identifier, a field intensity and a bit error rate.

29. The portable information terminal according to claim 25, wherein the communication terminal control section is detachable.

30. The portable information terminal according to claim 25, wherein said memory further stores:
- a first information access table that is referred to in selecting from among the first tables; and
- a second information access table that is referred to in selecting from among the second tables, and
- wherein said information terminal control section is responsive to the user-supplied requests to use the access information obtained by the communication terminal control section and the first and second information access tables to supply information from the first tables and second tables to said output device.

* * * * *